R. MANCHA.
STORAGE BATTERY LOCOMOTIVE.
APPLICATION FILED FEB. 5, 1917.
1,224,122.
Patented Apr. 24, 1917.
3 SHEETS—SHEET 2.
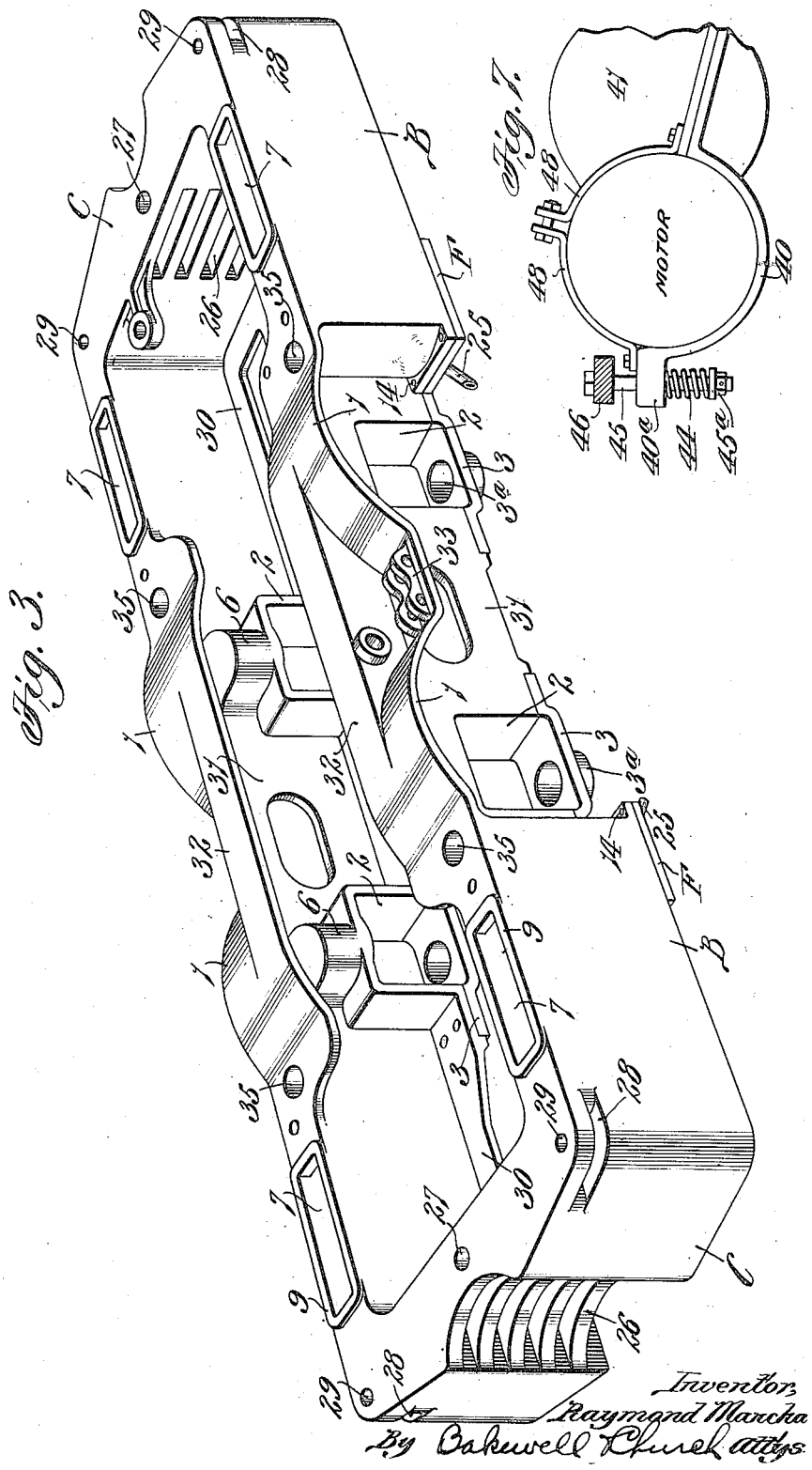
Inventor,
Raymond Mancha
By Bakewell & Church attys.

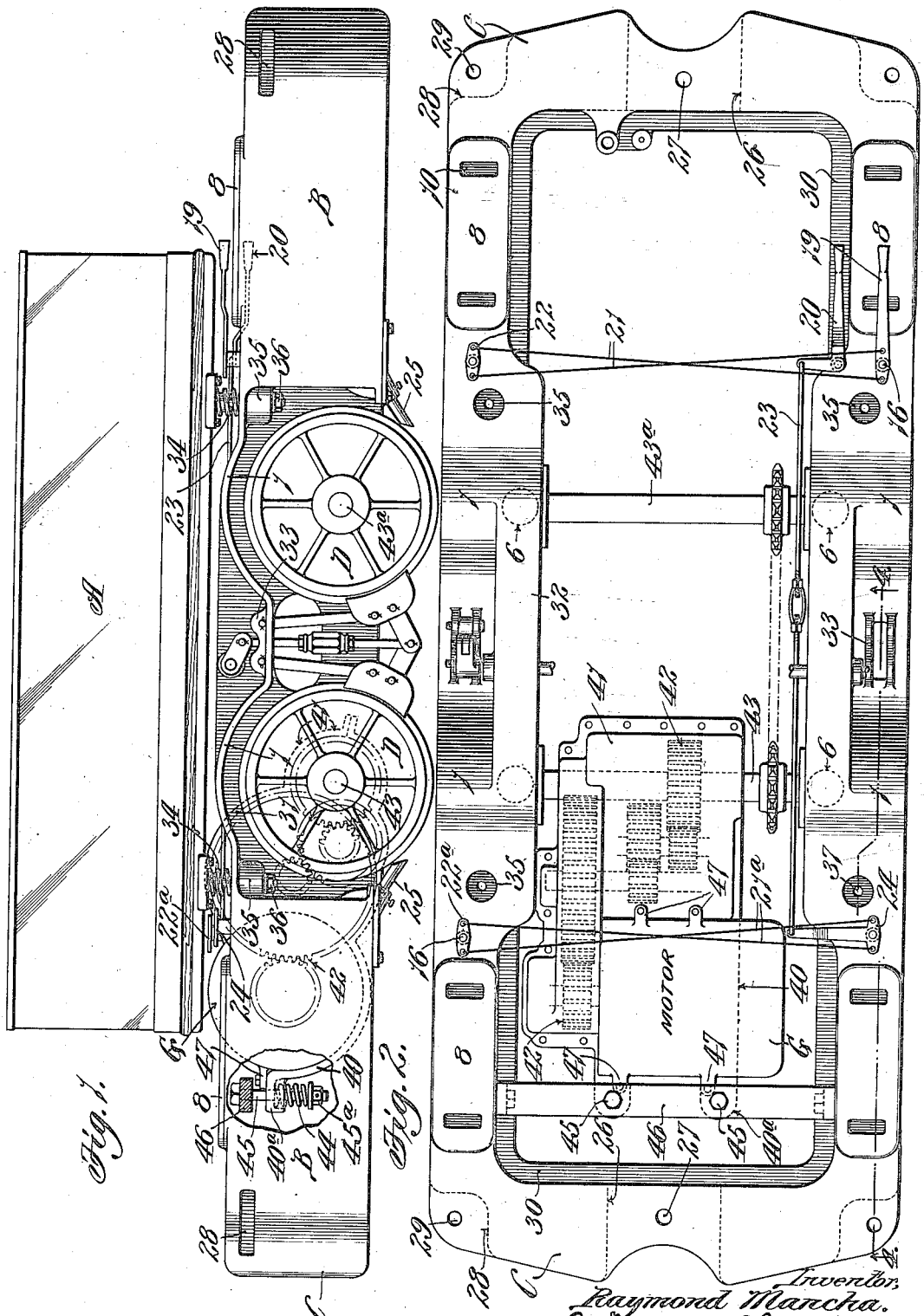

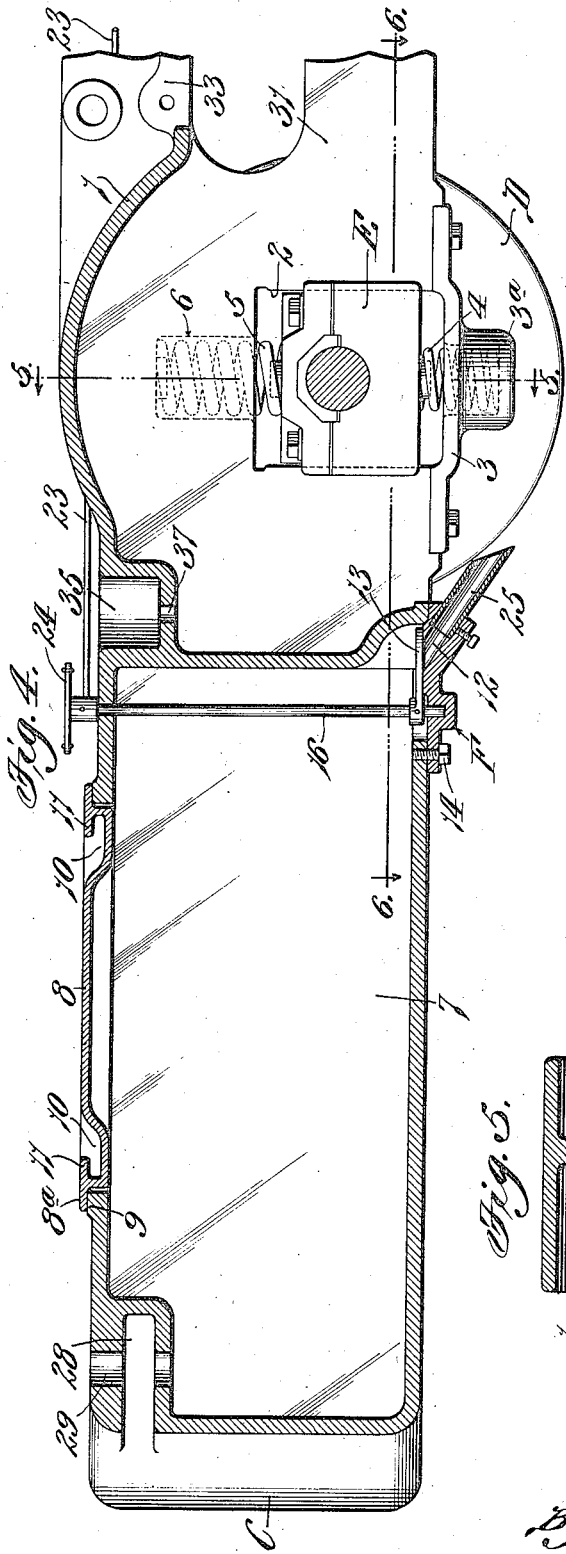

UNITED STATES PATENT OFFICE.

RAYMOND MANCHA, OF ST. LOUIS, MISSOURI.

STORAGE-BATTERY LOCOMOTIVE.

1,224,122.  Specification of Letters Patent.  Patented Apr. 24, 1917.

Application filed February 5, 1917. Serial No. 146,821.

*To all whom it may concern:*

Be it known that I, RAYMOND MANCHA, a citizen of the United States, residing at St. Louis, Missouri, have invented a certain new and useful Improvement in Storage-Battery Locomotives, of which the following is a full, clear, and exact description, such as will enable others skilled in the art to which it appertains to make and use the same.

This invention relates to storage battery locomotives, and has for its main object to provide a locomotive of the type referred to that is exceptionally strong and rugged, inexpensive to manufacture and not liable to get out of order when in service.

Another object is to provide a storage battery locomotive in which the storage battery is mounted on the truck in a novel manner.

Another object is to provide a truck frame for storage battery locomotives in which the side members of the frame are equipped with integral sand boxes.

And still another object of my invention is to provide a locomotive of the type referred to, in which the gears are incased in an oil-tight housing that is provided with a saddle which supports the motor, said housing and saddle being supported by one of the wheel axles and by springs carried by an element on the frame of the truck. Other objects and desirable features of my invention will be hereinafter pointed out.

Figure 1 of the drawings is a side elevational view of a storage battery locomotive constructed in accordance with my invention.

Fig. 2 is a top plan view of the truck.

Fig. 3 is a perspective view of the frame of the truck.

Fig. 4 is an enlarged vertical sectional view, taken on the line 4—4 of Fig. 2.

Fig. 5 is a vertical cross-sectional view, taken on the line 5—5 of Fig. 4, looking in the direction indicated by the arrows and with the journal box and journal box springs removed.

Fig. 6 is a horizontal sectional view, taken on the line 6—6 of Fig. 4 with the journal box removed; and Fig. 7 is a detail view, illustrating another way of retaining the motor in its saddle.

Referring to the drawings, which illustrate the preferred form of my invention, A designates the storage battery of the locomotive, B designates the side members of the truck frame, C designates the end sills of said frame and D designates the wheels of the truck. The frame of the truck is formed of cast metal and the side members and end sills of same are integrally connected together, as shown in Fig. 3, said side members having wheel pockets formed in the outer sides of same whose top walls are formed by curved wheel guards 1 which are integrally connected to the side members B of the frame. The journal boxes E are arranged in integral guides 2 on the side members B of the frame, which guides are of substantially inverted U-shape in outline, so that the journal boxes can be slipped upwardly into same. The lower ends of said journal box guides are closed by removable plates 3 that are detachably connected to the side members B of the frame, said plates having integral spring seats 3ª that receive springs 4 which are arranged under the journal boxes E. Springs 5 that are arranged between the upper sides of the journal boxes and the side members B of the frame are seated in integral spring seats 6 on the horizontally-disposed top walls of the journal box guides 2, the purpose of equipping the truck with springs that are arranged above the journal boxes being to compensate for irregularities in the track.

The portions of the side members B that lie between the end sills C and the wheel pockets are hollow, so that they will serve as sand boxes 7, as shown in Fig. 4, each of said sand boxes being provided at its upper side with a filling opening that is normally closed by a cover plate 8 provided with a laterally-projecting flange 8ª that laps over and bears upon a bearing rib or raised portion 9 on the side member of the frame that extends around the upper edge of the filling opening of the sand box. The cover 8 is provided in its upper side with one or more recesses or depressions 10 that extend underneath a finger grip 11, as shown in Fig. 4, so as to form a tight cover that can be removed easily and whose top surface is free from projections. Each of said sand boxes is provided with a discharge opening 12 and with a valve 13 for controlling the discharge of the sand from the box. Each of the sand boxes 7 is preferably provided with a removable portion F in which the discharge opening 12 and the seat for the valve 13 is formed, said portion F being arranged at one of the lower corners of the box, as shown in Fig. 4, and retained in position by bolts or other suitable fastening devices 14. The valve 13 is connected to a vertically-disposed shaft 16 that is journaled at its lower end in the removable portion F, the upper end of said shaft passing through the top wall of the sand box. Any suitable means may be used for turning the shafts 16, so as to open and close the valves 13, the means that I prefer to use consisting of two hand levers 19 and 20 arranged in proximity to the operator in charge of the locomotive and connected by means of links or rods with levers on the upper ends of the shafts 16. As shown in Fig. 2, the lever 19 is rigidly connected to the upper end of one of the valve shafts 16 and is joined by means of crossed links 21 with a lever 22 on the shaft 16 of the valve that coöperates with the sand box located at the other side of the truck frame. The lever 20 is of bell crank form and is joined by a link 23 to a substantially T-shaped lever 24 on one of the valve shafts 16 located at the other end of the truck frame, said lever 24 being connected by means of crossed links 21$^a$ with a lever 22$^a$ on the valve shaft 16 at the opposite side of the truck frame.

Each of the end sills C of the truck frame is provided with a plurality of horizontally-disposed slots formed by integral flanges 26 on the end sill that are arranged one above the other, so as to receive a coupling device (not shown) that can be connected to the end sill by means of a coupling pin arranged in vertically alined holes 27 in the top face of the end sill and in the horizontally-disposed flanges 26 that lie underneath same. By constructing the end sill in this manner I am able to connect the truck to other trucks or cars whose end sills are higher or lower, by simply arranging the coupling device in one or the other of the slots between the horizontal flanges 26. The flanges 26 are preferably recessed into the end sills, so as to protect the hands of the operators in coupling or uncoupling cars. I also prefer to form horizontally-disposed slots 28 in the four corners of the frame of the truck, as shown in Fig. 3, so as to receive coupling devices connected to a car or locomotive traveling on a parallel track, or, in other words, a track arranged at one side of the track on which my improved locomotive is traveling, the portions of the frame in which the slots 28 are formed being provided with openings 29 for receiving coupling pins.

One of the end portions of the frame in which the sand boxes 7 are formed is utilized as a cock pit for the operator or operators in charge of the locomotive, and the other end portion of the frame receives the motor, as shown in Fig. 2. I prefer to provide the end portions of the frame with horizontally-disposed flanges 30, as shown in Fig. 3, on which floor boards (not shown) can be mounted, the operator sitting on the cover of the sand box on one side of the frame or on a seat extending over said cover. The intermediate portions of the frame in which the wheel pockets are formed each comprises a vertically-disposed web 31 provided at its upper edge with a horizontally-disposed flange 32 that merges into the top walls of the sand boxes between which said web lies, the wheel guards I previously referred to being integrally connected to the web 31 and to the inner end portions of the sand boxes between which it is arranged, so as to stiffen the intermediate portion of the frame of the truck. As shown in Fig. 3, lugs 33 are formed on the wheel guards, so as to serve as bearings for certain parts of the brake mechanism illustrated in Fig. 1 of the drawings.

The storage battery A of the locomotive is mounted on springs 34, shown in Fig. 1, which are arranged in integral spring seats or pockets 35 on the side members B of the truck frame, each of said springs having combined therewith a bolt or other suitable device 36 that projects downwardly through a hole 37 in the bottom of the coöperating spring seat and provided at its lower end with a stop or nut, as shown in Fig. 4, so as to limit the upward movement of the storage battery with relation to the truck frame.

The electric motor G of the locomotive is mounted in a saddle 40 that is combined with an oil-tight housing or gear case 41, which incases the gears 42 that are arranged between the motor and one of the wheel axles 43, as shown in Fig. 2. The gear case 41 is mounted directly on the wheel axle 43, and the motor saddle 40, which projects forwardly from the other end of the gear case, is supported by springs 44 carried by rods 45 that depend from a cross member 46 on the truck frame. As shown in Fig. 2, the springs 44 are arranged between forwardly projecting lugs 40$^a$ on the motor saddle and nuts 45$^a$ on the lower ends of the rods 45, such a construction providing practically a three-point suspension for the motor and the gear case. The gear case 41 is split so that it can be mounted easily on the axle 43 and the motor housing can either be provided with lugs 47 that are bolted to the gear case and to the saddle, as shown in Figs. 1 and 2, or the saddle can be provided with a two-part clamping device 48, as shown in Fig. 7 that holds the motor in operative position in the saddle. If desired, the wheel axle 43 can be connected up with the other wheel axle 43$^a$ by means of a sprocket chain that coöperates with sprocket wheels 49 on said axles, as shown in Fig. 2.

A storage battery locomotive of the construction above described is exceptionally strong, rigid and compact, as the frame of the truck consists of a single casting and the gears and motor are combined with an oil-tight housing and saddle which have a three-point suspension on one of the wheel axles and on springs that are suspended from a cross member on the frame. Such a locomotive can be manufactured cheaply, as it requires very little machining, the sand boxes, the journal box guides and most of the spring seats being formed integrally with the side members of the truck frame. The truck of the locomotive is so designed that it can easily be connected to a car or locomotive traveling on an adjacent parallel track or connected to a car or locomotive traveling on the same track and provided with a higher or lower end sill; the journal boxes of the truck are combined with springs that are arranged above same, thus compensating for irregularities in the track; and still another desirable feature of such a locomotive is that the storage battery is sustained by springs carried by the frame of the truck, each of which springs has combined therewith a means which limits the upward movement of the storage battery with relation to the truck frame, and thus effectively prevents abnormal displacement of the battery when the truck is traveling over a rough track. While it is not essential to the successful operation of my invention that the sand boxes be provided with removable portions that carry the valves which govern the discharge of the sand from the sand boxes, still I prefer to form the frame of the truck in the manner herein illustrated, on account of the fact that such a construction greatly simplifies the machining of the frame and permits the valves of the sand boxes to be removed easily for replacement or repair.

Having thus described my invention, what I claim, and desire to secure by Letters Patent, is:

1. A storage battery locomotive equipped with a truck whose frame is composed of a single casting having integral sand boxes.

2. A storage battery locomotive provided with a truck whose frame is equipped with hollow portions cast integral with the end sills and the side members of the frame so as to serve as sand boxes.

3. A truck frame for storage battery locomotives composed of side members and end sills integrally connected together, said side members being provided with integral sand boxes and with integral journal box guides.

4. A truck frame for storage battery locomotives, comprising cast metal end sills and side members integrally connected together, said side members having integral sand boxes and wheel pockets arranged intermediate said sand boxes.

5. A truck frame for storage battery locomotives composed of end sills and side members integrally connected together, said side members having integral sand boxes and integral wheel guards.

6. A truck frame for storage battery locomotives, comprising a side member provided at its opposite ends with integral hollow portions that serve as sand boxes, and an intermediate portion that forms pockets for the wheels of the truck.

7. A truck frame for storage battery locomotives, consisting of a single casting comprising side members, each of which is equipped with integral sand boxes and integral journal box guides of substantially inverted U-shape in outline.

8. A truck frame for storage battery locomotives composed of a single casting provided with integral journal box guides, spring seats and sand boxes.

9. A truck frame for storage battery locomotives, comprising a side frame having hollow end portions, and a web-like intermediate portion that is equipped with an integral wheel guard.

10. A truck frame for storage battery locomotives, comprising a side frame having hollow end portions, a web-like intermediate portion that is equipped with an integral wheel guard, and integral spring seats and journal box guides on said intermediate portion.

11. A truck frame for storage battery locomotives provided with an end sill that is integrally connected to hollow members that serve as sand boxes.

12. A truck for storage battery locomotives provided with a cast metal frame that is equipped with a hollow portion that serves as a sand box, and a removable element on said frame that forms part of said sand box and which has an opening therein through which the sand escapes from said box.

13. A cast metal truck frame for storage battery locomotives provided with a sand box that is formed partly by an integral portion of said frame and by a removable member detachably connected to said frame.

14. A cast metal truck frame for storage battery locomotives provided with a sand box that is formed partly by an integral portion of said frame and by a removable member detachably connected to said frame, and a valve for said sand box carried by said removable member.

15. A truck frame for storage battery locomotives provided with an integral sand box, one of whose corner portions is provided with a removable member having a flat valve seat.

16. A truck frame for storage battery locomotives, comprising end sills and side members integrally connected together, said side members being provided with sand box portions and with integral flanges that serve as supports for floor boards.

17. A truck frame for storage battery locomotives, comprising side members provided with integral journal box guides, journal boxes arranged in said guides, removable devices at the lower ends of said guides that lie underneath the journal boxes, and springs arranged above and below the journal boxes and seated in pockets in said guides and removable members.

18. A storage battery locomotive, comprising a storage battery and a truck whose frame is provided with integral spring pockets, springs in said pockets for supporting said storage battery, depending devices on said storage battery that project downwardly through openings in said spring pockets, and stops on said devices arranged below the bottom of said pockets for limiting the upward movement of said storage battery with relation to the truck.

19. A truck frame for storage battery locomotives, consisting of a casting that comprises side members and end sills integrally connected together, integral sand boxes in said side members provided with removable portions, integral journal box guides on said side members, integral pockets in said side members for receiving springs that support the storage battery of the locomotive, and slots or openings in said end sills arranged in different horizontal planes for receiving a coupling device and recessed into said sills so as to protect the hands of the operators in coupling or uncoupling cars.

RAYMOND MANCHA.